US012700211B2

(12) United States Patent
Yu et al.

(10) Patent No.: US 12,700,211 B2
(45) Date of Patent: Aug. 4, 2026

(54) BYSTANDER AND ATTACHED SHADOW REMOVAL

(71) Applicant: Google LLC, Mountain View, CA (US)

(72) Inventors: Lucy Yu, Mountain View, CA (US);
Andrew Liu, Mountain View, CA (US);
Orly Liba, Mountain View, CA (US)

(73) Assignee: Google LLC, Mountain View, CA (US)

( * ) Notice: Subject to any disclaimer, the term of this patent is extended or adjusted under 35 U.S.C. 154(b) by 309 days.

(21) Appl. No.: 18/195,401

(22) Filed: May 10, 2023

(65) Prior Publication Data

US 2024/0378844 A1     Nov. 14, 2024

(51) Int. Cl.
| | |
|---|---|
| *G06V 10/26* | (2022.01) |
| *G06T 5/77* | (2024.01) |
| *G06T 7/194* | (2017.01) |
| *G06V 10/75* | (2022.01) |
| *G06V 10/774* | (2022.01) |
| *G06V 10/82* | (2022.01) |
| *G06V 20/40* | (2022.01) |

(52) U.S. Cl.
CPC ................ *G06V 10/26* (2022.01); *G06T 5/77* (2024.01); *G06T 7/194* (2017.01); *G06V 10/75* (2022.01); *G06V 10/774* (2022.01); *G06V 10/82* (2022.01); *G06V 20/41* (2022.01); *G06T 2207/10016* (2013.01); *G06T 2207/20021* (2013.01); *G06T 2207/20081* (2013.01); *G06T 2207/30196* (2013.01); *G06V 2201/08* (2022.01)

(58) Field of Classification Search
CPC ...... G06V 10/26; G06V 10/75; G06V 10/774; G06V 10/82; G06V 20/41; G06V 2201/08; G06T 5/77; G06T 7/194; G06T 2207/10016; G06T 2207/20021; G06T 2207/20081; G06T 2207/30196; G06T 2207/20084; G06T 7/11; G06T 7/174
See application file for complete search history.

(56) References Cited

U.S. PATENT DOCUMENTS

2022/0129682 A1 *   4/2022   Tang ........................ G06T 7/74

FOREIGN PATENT DOCUMENTS

JP        2007-272292        10/2007

OTHER PUBLICATIONS

Repopulating Street Scenes, Wang et al 2021 (Year: 2021).*
(Continued)

*Primary Examiner* — Jianxun Yang
(74) *Attorney, Agent, or Firm* — IP Spring

(57) ABSTRACT

A media application derives a bystander mask from an image by analyzing the image with a bystander segmentation model, wherein the image depicts a bystander and the bystander mask identifies a plurality of first pixels in the image that are associated with the bystander. The media derives a shadow mask for the bystander by analyzing the image with a shadow segmentation model, wherein the image and the bystander mask are provided as input to the shadow segmentation model, and wherein the shadow mask identifies a plurality of second pixels in the image that are associated with a shadow of the bystander. The media application modifies the image to update pixel values of the plurality of first pixels and the plurality of second pixels such that the bystander and the shadow are erased from the image.

20 Claims, 12 Drawing Sheets

(56)        References Cited

OTHER PUBLICATIONS

EPO, International Search Report for International Patent Application No. PCT/US2023/081647, Mar. 18, 2024, 5 pages.
EPO, Written Opinion for International Patent Application No. PCT/US2023/081647, Mar. 18, 2024, 7 pages.
Lu, Erika et al., "Omnimatte: Associating Objects and Their Effects in Videos", Proceedings of the IEEE/CVF Conference on Computer Vision and Pattern Recognition, 2021, 9 pages.
Wang, Tianyu et al., "Instance Shadow Detection", Proceedings of the IEEE/CVF Conference on Computer Vision and Pattern Recognition, 2020, 10 pages.
Xing, Zhenghao et al., "Video Instance Shadow Detection", arXiv preprint arXiv:2211.12827, 2022, 10 pages.
Wang, et al., "Instance Shadow Detection", https://doi.org/10.48550/arXiv.1911.07034, Jun. 9, 2020, 10 pages.
Wang, et al., "Repopulating Street Scenes", Proceedings of the IEEE/CVF Conference on Computer Vision and Pattern Recognition, 2021, pp. 5110-5119.
King, et al., "Video Instance Shadow Detection", https://doi.org/10.48550/arXiv.2211.12827, Nov. 23, 2022, 10 pages.
EPO, Communication Under Rule 71(3) EPC for European Patent Application No. 23840822.3, May 7, 2026, 8 pages.
Hong, et al., "Shadow Generation for Composite Image in Real-World Scences", Proceedings of the AAAI Conference on Artificial Intelligence, vol. 36, No. 1, Mar. 6, 2022, pp. 914-922.
JPO, Notice of Reasons for Refusal (with English translation) for Japanese Patent Application No. 2025-534774, May 19, 2026, 9 pages.
Tsubota, et al., "Video Restoration Using SiamMask", Journal of the Society of Image Electronics, vol. 50, No. 4, Oct. 30, 2021, pp. 614-618,

* cited by examiner

100

Media Server 101

Media Application 103a

Database 199

102

Network 105

108

110

User Device 115n

Media Application 103c

User 125n

User Device 115a

Media Application 103b

User 125a

450

452

454

410

412

424

400

402

404

460

462

464

1100

Derive a bystander mask from an image by analyzing the image with a bystander segmentation model, where the image depicts a bystander and the bystander mask identifies a plurality of first pixels in the image that are associated with the bystander 1102

Determine a likelihood of existence of the shadow using a shadow classifier model based on the image and the bystander mask 1104

Derive a shadow mask for the bystander by analyzing the image with a shadow segmentation model, where the image and the bystander mask are provided as input to the shadow segmentation model, and where the shadow mask identifies a plurality of second pixels in the image that are associated with a shadow of the bystander 1106

Merge the bystander mask and the shadow mask 1108

Modify the image to update pixel values of the plurality of first pixels and the plurality of second pixels such that the bystander and the shadow are erased from the image 1110

Apply an inpainting technique to update the pixel values of the plurality of first pixels and the plurality of second pixels 1112

FIG 11

BYSTANDER AND ATTACHED SHADOW REMOVAL

BACKGROUND

The appeal of visual media items, such as images (static images, images with selective motion, etc.) and videos can be improved by removing bystanders that distract from the focus of the media items. However, when a bystander is attached to a shadow, pixels associated with the bystander may be identified and modified to remove the bystander, while pixels associated with the shadow remain. Previous techniques have attempted to solve this issue by generating a shadow mask, but the shadow mask is difficult to generate accurately. For example, the process of identifying shadows may result in false positives in shadow mask candidates where an area larger than the shadow is removed. In addition, in situations where a person in the image does not cast a shadow, the process of identifying shadows may result in identifying shadows that belong to other objects. When object classification is used for image editing purposes (e.g., substituting the bystander with pixels that match background), the resultant image may be unsatisfactory due to the presence of pixels associated with the shadow that remain in the image even after the bystander has been erased.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes deriving a bystander mask from an image by analyzing the image with a bystander segmentation model, where the image depicts a bystander and the bystander mask identifies a plurality of first pixels in the image that are associated with the bystander. The method further includes deriving a shadow mask for the bystander by analyzing the image with a shadow segmentation model, where the image and the bystander mask are provided as input to the shadow segmentation model, and where the shadow mask identifies a plurality of second pixels in the image that are associated with a shadow of the bystander. The method further includes modifying the image to update pixel values of the plurality of first pixels and the plurality of second pixels such that the bystander and the shadow are erased from the image.

In some embodiments, the method further includes determining a likelihood of existence of the shadow using a shadow classifier model based on the image and the bystander mask, where deriving the shadow mask for the bystander is performed if the likelihood of existence of the shadow meets a threshold. In some embodiments, modifying the image comprises applying an inpainting technique to update the pixel values of the plurality of first pixels and the plurality of second pixels. In some embodiments, the inpainting technique is performed by an inpainter model. In some embodiments, the method further includes, prior to the modifying, merging the bystander mask and the shadow mask. In some embodiments, the shadow segmentation model includes a convolutional neural network trained using supervised learning, wherein training the convolutional neural network is performed with a training dataset that includes a plurality of training images, a segmentation mask associated with a person in each training image of the plurality of training images, and a groundtruth shadow mask for each training image of the plurality of training images, and wherein the training comprises, for each training image of the plurality of training images: obtaining a predicted shadow mask based on the training image and the segmentation mask associated with the person in the training image, calculating a loss value based on a comparison of the predicted shadow mask and the groundtruth shadow mask for the image, and updating a weight of one or more nodes of the convolutional neural network based on the loss value. In some embodiments, the training dataset is generated by including a candidate image in the plurality of training images that is selected from the group of the person being associated with a body bounding box that is less than a threshold overlap value with a vehicle bounding box, the body bounding box being associated with an aspect ratio that is less than a threshold aspect ratio, the segmentation mask being outside of a vehicle bounding box, the body bounding box intersecting with a mobile object bounding box less than the threshold overlap value, the groundtruth shadow mask being between a threshold first size and a threshold second size, the plurality of training images meeting an illumination threshold, the candidate image including a shadow that emanates from a direction associated with feet of the person, and combinations thereof. In some embodiments, one or more training images in the plurality of training images are associated with an empty groundtruth shadow mask. In some embodiments, one or more training images in the plurality of training images are generated from a series of candidate images of a scene that includes a person captured at different times by: generating a clean-plate image that contains static elements of the scene, comparing each candidate image in the series of candidate images to the clean-plate image to identify dynamic parts of the scene, generate the segmentation mask for the person in the series of images, and determining from the segmentation masks that pixels for the groundtruth shadow mask are adjacent to pixels corresponding to the segmentation mask. In some embodiments, the shadow segmentation model includes a convolutional neural network trained using supervised learning, where training the convolutional neural network is performed with a training dataset that includes a plurality of training images and a groundtruth shadow mask for each training image of the plurality of training images, and where the training comprises, for each training image of the plurality of training images: obtaining a predicted shadow mask based on the training image, where one or more pixels of the training image that are associated with a person have values associated with a particular color that does not occur in natural images, calculating a loss value based on a comparison of the predicted shadow mask and the groundtruth shadow mask for the image, and updating a weight of one or more nodes of the convolutional neural network based on the loss value. In some embodiments, the image depicts two or more bystanders and the deriving, obtaining, and modifying are performed for each of the two or more bystanders. In some embodiments, the image is a single frame of a video. In some embodiments, at least one pixel in the first plurality of pixels of the bystander mask and at least one pixel in the second plurality of pixels of the shadow mask are adjacent.

In some embodiments, a non-transitory computer-readable medium with instructions stored thereon that, when executed by one or more computers, cause the one or more computers to perform operations including: deriving a bystander mask from an image by analyzing the image with a bystander segmentation model, where the image depicts a bystander and the bystander mask identifies a plurality of first pixels in the image that are associated with the bystander, deriving a shadow mask for the bystander by analyzing the image with a shadow segmentation model, where the image and the bystander mask are provided as input to the shadow segmentation model, and where the shadow mask identifies a plurality of second pixels in the image that are associated with a shadow of the bystander, and modifying the image to update pixel values of the plurality of first pixels and the plurality of second pixels such that the bystander and the shadow are erased from the image.

In some embodiments, the operations further include determining a likelihood of existence of the shadow using a shadow classifier model based on the image and the bystander mask, where deriving the shadow mask for the bystander is performed if the likelihood of existence of the shadow meets a threshold. In some embodiments, modifying the image comprises applying an inpainting technique to update the pixel values of the plurality of first pixels and the plurality of second pixels. In some embodiments, the operations further include, prior to the modifying, merging the bystander mask and the shadow mask.

In some embodiments, a computing device comprises one or more processors and a memory coupled to the one or more processors, with instructions stored thereon that, when executed by the processor, cause the processor to perform operations. The operations may include deriving a bystander mask from an image by analyzing the image with a bystander segmentation model, where the image depicts a bystander and the bystander mask identifies a plurality of first pixels in the image that are associated with the bystander, deriving a shadow mask for the bystander by analyzing the image with a shadow segmentation model, where the image and the bystander mask are provided as input to the shadow segmentation model, and where the shadow mask identifies a plurality of second pixels in the image that are associated with a shadow of the bystander, and modifying the image to update pixel values of the plurality of first pixels and the plurality of second pixels such that the bystander and the shadow are erased from the image.

In some embodiments, the operations further include determining a likelihood of existence of the shadow using a shadow classifier model based on the image and the bystander mask, where deriving the shadow mask for the bystander is performed if the likelihood of existence of the shadow meets a threshold. In some embodiments, modifying the image comprises applying an inpainting technique to update the pixel values of the plurality of first pixels and the plurality of second pixels.

The techniques described in the specification advantageously solve the problem of identifying a shadow attached to a bystander for removal from the image. The shadow segmentation model takes a bystander mask as input and predicts the mask of their shadow. The bystander segmentation model updates to use state-of-the-art person detection and segmentation, instead of trying to make the shadow segmentation model detect people as accurately as state-of-the-art person detectors. The techniques additionally include a way of generating a training data set for training a machine-learning model that reduces false positives and includes examples where a bystander casts no shadow. Lastly, the techniques include segmentation pipelines with different classifiers to predict the shadows of bystanders.

BRIEF DESCRIPTION OF THE DRAWINGS

FIG. 11 illustrates an example flowchart of a method to modify an image to erase a bystander and their shadow from an image based on a derived bystander mask and a derived shadow mask, according to some embodiments described herein.

DETAILED DESCRIPTION

Example Environment 100

Figure 1:
FIG. 1 is a block diagram of an example network environment to identify shadows attached to bystanders, according to some embodiments described herein.

FIG. 1 illustrates a block diagram of an example environment 100 to identify shadows attached to bystanders. In some embodiments, the environment 100 includes a media server 101, a user device 115a, and a user device 115n coupled to a network 105. Users 125a, 125n may be associated with respective user devices 115a, 115n. In some embodiments, the environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115a, 115n via the network 105. The media server 101 may include a media application 103a and a database 199.

The database 199 may store machine-learning models, training data sets, images, etc. The database 199 may also store social network data associated with users 125, user preferences for the users 125, etc.

The user device 115 may be a computing device that includes a memory coupled to a hardware processor. For example, the user device 115 may include a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. The media application 103 may be stored as media application 103b on the user device 115a and/or media application 103c on the user device 115n. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

The media application 103 may be stored on the media server 101 or the user device 115. In some embodiments, the operations described herein are performed on the media server 101 or the user device 115. In some embodiments, some operations may be performed on the media server 101 and some may be performed on the user device 115. Performance of operations is in accordance with user settings. For example, the user 125a may specify settings that operations are to be performed on their respective device 115a and not on the server 101. With such settings, operations described herein (e.g., with reference to FIGS. 9-11) are performed entirely on user device 115a and no operations are performed on the media server 101. Further, a user 125a may specify that images and/or other data of the user is to be stored only locally on a user device 115a and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

Machine learning models (e.g., neural networks or other types of models), if utilized for one or more operations, are stored and utilized locally on a user device 115, with specific user permission. Server-side models are used only if permitted by the user. Further, a trained model may be provided for use on a user device 115. During such use, if permitted by the user 125, on-device training of the model may be performed. Updated model parameters may be transmitted to the media server 101 if permitted by the user 115, e.g., to enable federated learning. Model parameters do not include any user data.

In some embodiments, the media application 103 may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103a may be implemented using a combination of hardware and software.

The media application 103 receives an image that depicts a bystander. For example, the media application 103 receives an image from a camera that is part of the user device 115 or the media application 103 receives the image over the network 105. The media application 103 derives a bystander mask from the image by analyzing the image with a bystander segmentation model. The bystander mask identifies a plurality of first pixels in the image that are associated with the bystander.

In some embodiments, the image and the bystander mask are provided as input to a shadow segmentation model. In some embodiments, a shadow classifier model is applied to the image to determine if a likelihood of a shadow being present in the image meets a threshold. In these embodiments, the shadow segmentation model is used if the likelihood of the shadow being present in the mage meets the threshold, and otherwise, bystander removal is performed without use of the shadow segmentation model. The shadow segmentation model derives the shadow mask for the bystander by analyzing the image. The shadow mask identifies a plurality of second pixels in the image that are associated with a shadow of the bystander.

The media application 103 modifies the image to update pixel values of the plurality of first pixels and the plurality of second pixels such that the bystander and the shadow are erased from the image. In some embodiments, the media application 103 includes an inpainter model that applies an inpainting technique to update the pixel values.

Example Computing Device 200

Figure 2:
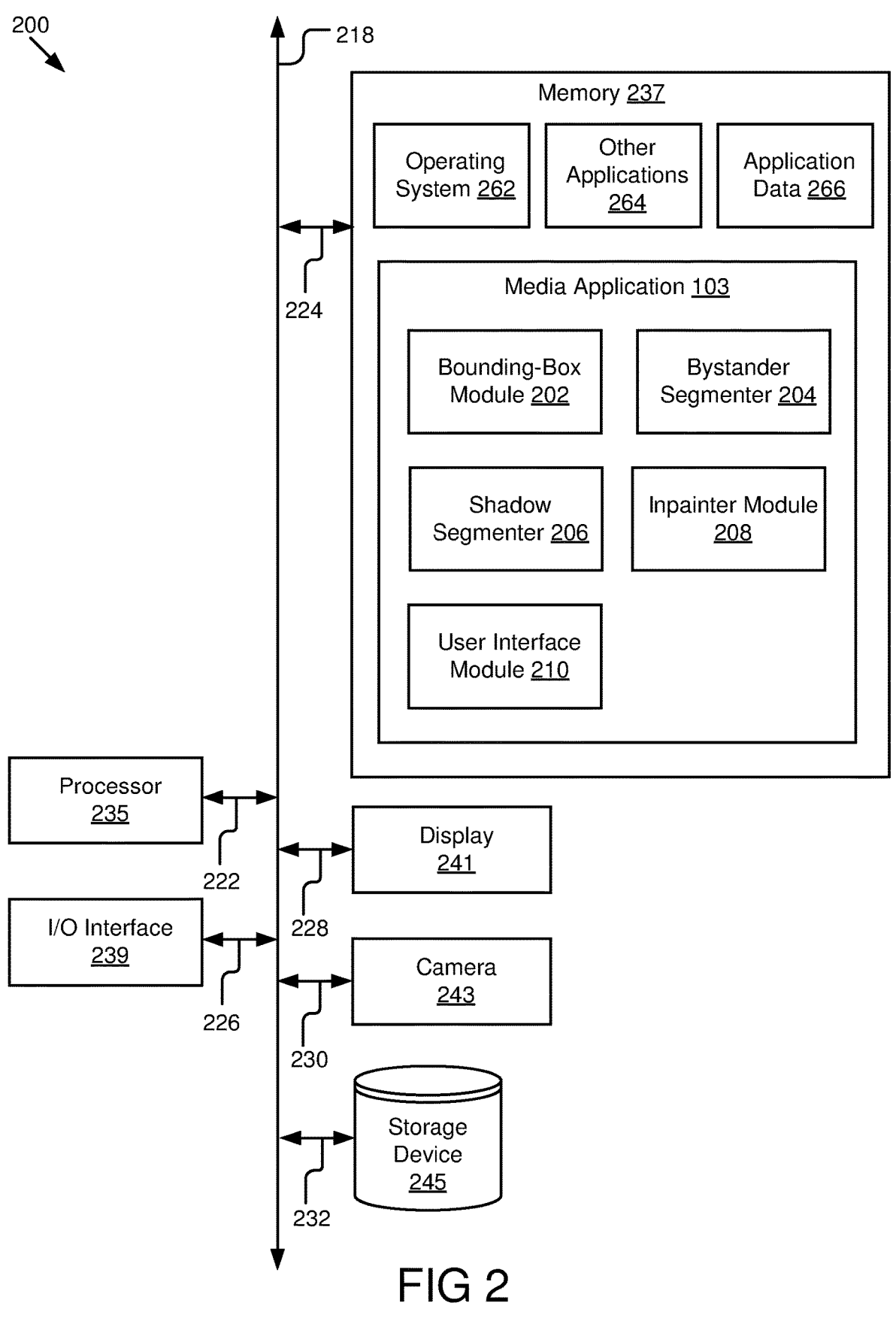
FIG. 2 is a block diagram of an example computing device to identify shadows attached to bystanders, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is media server 101 used to implement the media application 103a. In another example, computing device 200 is a user device 115.

In some embodiments, computing device 200 includes a processor 235, a memory 237, an input/output (I/O) interface 239, a display 241, a camera 243, and a storage device 245, all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., an image library application, an image management application, an image gallery application, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images used by the image library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes an image with a bystander and their shadow removed. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store a training data set that includes training data, such as a plurality of training images, a bystander segmentation model, a shadow segmentation model, an inpainter model, etc.

FIG. 2 illustrates an example media application 103 that includes a bounding-box module 202, a bystander segmenter 204, a shadow segmenter 206, an inpainter module 208, and a user interface module 210. In some embodiments, each of the components includes a set of instructions executable by the processor 235 to perform the steps discussed in greater detail below. In some embodiments, each of the components are stored in the memory 237 of the computing device 200 and can be accessible and executable by the processor 235.

Figure 3:
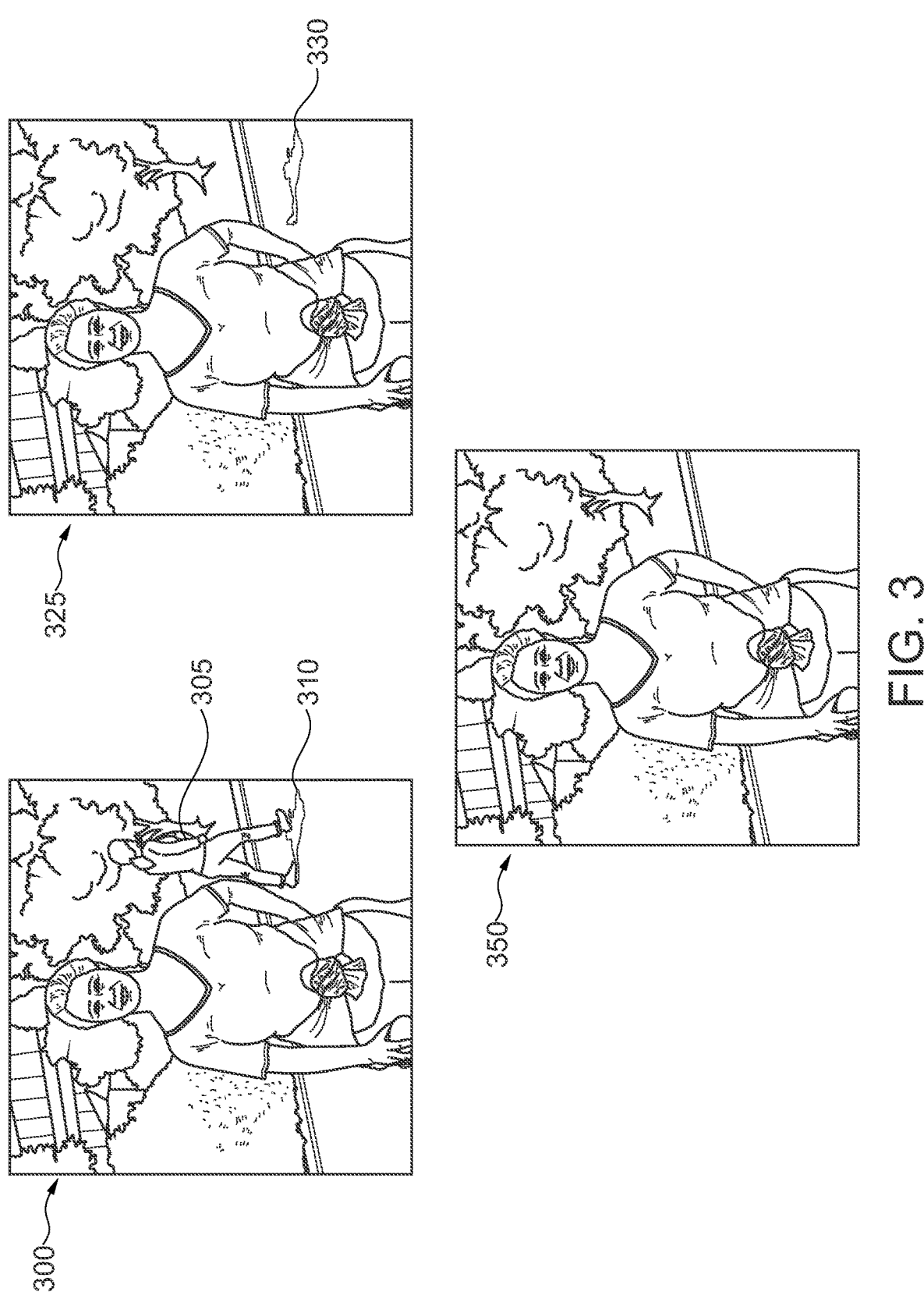
FIG. 3 illustrates an example image, an example image with the bystander and not the shadow removed, and an example image with both the bystander and the shadow removed according to some embodiments described herein.

In some embodiments, the components of the media application 103 identify a bystander in an image, identify a shadow associated with the bystander, and update pixel values associated with the bystander and the shadow from the image to erase the bystander and the shadow. FIG. 3 illustrates three example images. In the first example image 300, a bystander 305 and a shadow 310 associated with the bystander are illustrated (the main subject of the image is the woman facing the camera that captured image 300). In the second example image 325 the bystander is removed, but the shadow 330 remains. This example is distracting and unnatural, because the shadow 330 is not connected to an object and provides an unsatisfactory result of erasing the bystander 305. In the third example image 350, both the bystander and the shadow are removed, and the image is satisfactory. Although the description below describes a single bystander and a single shadow, the description also applies to two or more bystanders associated with two or more corresponding shadows.

Turning to the bounding-box module 202, in some embodiments, the bounding-box module 202 receives an image. The image may be received from the camera 243 of the computing device 200 or from the media server 101 via the I/O interface 239. In some embodiments, the image is part of a video, e.g., one frame of the video.

The image includes a subject, such as a person, and one or more bystanders. The bounding-box module 202 detects the bystander in the image. A bystander is a person that is not the subject of the image, such as people walking, running, riding a bicycle, standing behind the subject, or otherwise within the image. In different examples, a bystander may be in the foreground (e.g., a person visible in front of the subject, e.g., crossing between the camera 243 and the subject), at the same depth as the subject (e.g., a person standing to the side of the subject), or in the background (behind the subject). The bystander may be a human in an arbitrary pose, e.g., standing, sitting, crouching, lying down, jumping, etc. The bystander may face the camera 243, may be at an angle to the camera 243, or may face away from the camera 243.

In some embodiments, the bounding-box module 202 generates body bounding boxes for any person and/or bystander in an image. For example, FIG. 3 includes a person that is the subject of the image and a bystander. In another example, the training images discussed in greater detail below may include a person and no bystanders.

In some embodiments, the body bounding box is a rect-angular-shaped bounding box that encompasses all pixels for the person and/or bystander. The bounding-box module 202 may detect the person and/or bystander by performing object recognition, comparing the objects to object priors of people, and discarding objects that are not people. In some embodiments, the bounding-box module 202 uses a machine-learning algorithm, such as a neural network or more specifically, a convolutional neural network, to iden-tify the person and/or bystander and generate the body bounding box. The body bounding box is associated with x- and y-coordinates for the bounding box.

The bounding-box module 202 generates object bounding boxes that encompass the objects that overlap with the person and/or bystander in the image. In some embodiments, the bounding-box module 202 generates object bounding boxes for all objects in the image and then identifies the object bounding boxes for the objects that overlap with the bystander in the image. The intersecting object bounding boxes include, for example, a person riding a bicycle, a person riding a scooter, a person inside a vehicle, etc.

The bystander segmenter 204 analyzes images with a bystander segmentation model to derive bystander masks from the images. A bystander mask is generated that encom-passes the bystander. The bystander segmenter 204 identifies a plurality of first pixels in the image that are associated with the bystander. In some embodiments, the bystander seg-menter 204 identifies the plurality of first pixels in the image based on analyzing pixels within a body bounding box generated by the bounding box module 202.

In some embodiments, the bystander mask is generated based on generating superpixels for the image and matching superpixel centroids to depth map values (e.g., obtained by the camera 243 using a depth sensor or by deriving depth from pixel values) to cluster detections based on depth. More specifically, depth values in a masked area may be used to determine a depth range and superpixels may be identified that fell within the depth range. However, the depth of the objects attached to the bystander is the same as the ground, which may result in an overinclusive bystander mask.

Another technique for generating a bystander mask includes weighing depth values based on how close the depth values are to the bystander mask where weights were represented by a distance transform map. However, the bystander mask may be both overinclusive of the ground and underinclusive of some of the objects.

A shadow segmenter 206 receives the image and the bystander mask as input to a shadow segmentation model. The shadow segmentation model analyzes the image and derives a shadow mask for the bystander where the shadow mask identifies a plurality of second pixels in the image that are associated with a shadow of the bystander.

In some embodiments, the shadow segmentation model is a trained machine-learning model. In some embodiments, the shadow segmenter 206 is configured to apply the bystander segmentation model to input data, such as application data 266 (e.g., an image captured by the user device 115) to output a bystander mask.

The shadow segmenter 206 uses training data to generate the shadow segmentation model. Model generation may be performed offline (e.g., on media server 101 or another server) and the shadow segmentation model provided as part of the shadow segmenter 206. For example, training data may include training images with a subject (e.g., a person, a building, a garden, etc.), and a shadow attached to the subject (positive examples) as well as training images with a person that casts no shadow (negative examples). In some embodiments, the training data further includes a body bounding box that surrounds the bystander and object bounding boxes for objects in the image.

The training images may be red-green-blue (RGB) images where the color of each pixel is characterized by the three components R, G, and B. In some embodiments, one or more of the RGB images is associated with a segmentation mask that corresponds to a person in the RGB image. In some embodiments, one or more of the RGB images is associated with a body bounding box that surrounds the person. In some embodiments, one or more of the RGB images includes pixels for a person that have values associated with a particular color that does not occur in natural images. For example, the shadow segmenter 206 may use a flood fill algorithm on the segmentation mask to identify and/or change adjacent values based on their similarity to an initial seed point to be associated with an uncommon color. In some embodiments, the flood fill algorithm is used to identify the location of a person in the image using the uncommon color instead of perturbing the person pixels of the RGB image.

Training data may be obtained from any source, e.g., a data repository specifically marked for training, data for which permission is provided for use as training data for machine learning, etc. In some embodiments, the training may occur on the media server 101 that provides the training data directly to the user device 115, the training occurs locally on the user device 115, or a combination of both.

In some embodiments, the training data may be obtained from a series of images (e.g., a timelapse or image burst) of a scene captured at different times. For example, the series of images may be obtained from security footage. The shadow segmenter 206 may extract three-dimensional cam-era position information, organize images based on the same three-dimensional camera position, and apply a median filter (or a mode filter) to the pixels across time to generate a clean-plate image based on a median or a mode of the pixel values. The median filter removes the dynamic objects from the image, such as dynamic vehicles, people, animals, etc. As a result, the clean-plate image represents the static elements of the scene, such as buildings, sidewalks, and roads.

The shadow segmenter 206 compares each individual frame in the series of images to the clean-plate image to identify the dynamic parts of the scene, which includes people and their shadows. The shadow segmenter 206 then uses the identification of the dynamic parts of the scene to identify potential people in each image by performing object recognition. The shadow segmenter 206 generates a seg-mentation mask for the person. The shadow segmenter 206 uses a connected-components algorithm (e.g., a breadth-first search) on the differences between the clean-plate image and the individual frames to identify all dynamic pixels that are adjacent to the pixels corresponding to the segmentation mask. These dynamic pixels form a high-quality mask of the person's shadow that is referred to as a groundtruth shadow mask is part of the training data.

In some embodiments, the shadow segmenter 206 uses criteria for determining whether a candidate training image is included or excluded from the training images. For example, the shadow segmenter 206 identifies candidate images to include as part of the training images based on an intersection between the body bounding box and an object bounding box.

Figure 4:
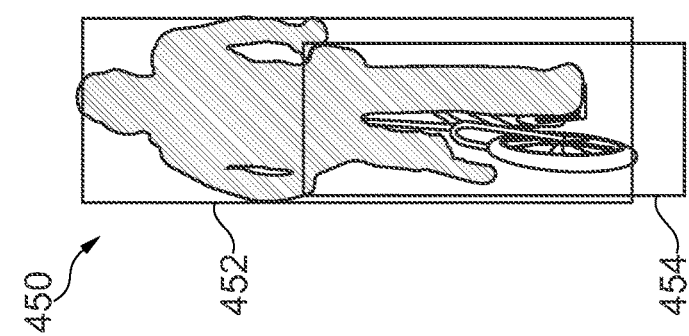
FIG. 4 illustrates example images that are excluded from the training data, according to some embodiments described herein.
Figure 4:
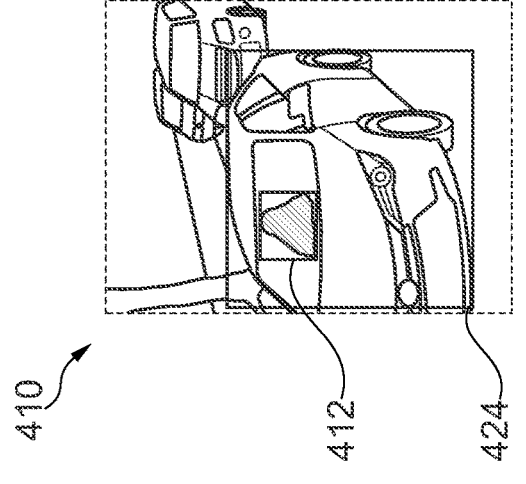
Figure 4:
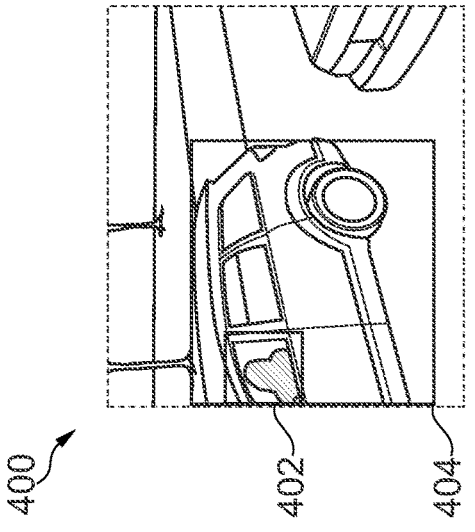
Figure 4:
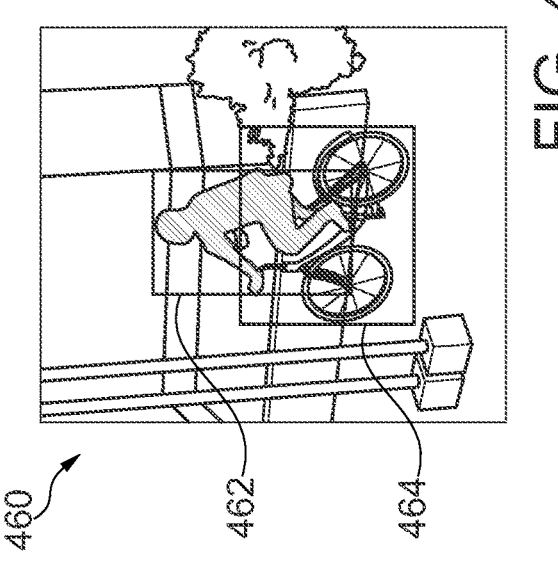

The shadow segmenter 206 may select candidate images to include in the training images where the bystander is associated with a body bounding box that has less than a threshold overlap value with a vehicle bounding box or a groundtruth bystander mask that is inside a vehicle bounding box. For example, FIG. 4 illustrates a first example image 400 and a second example image 410 where the body bounding boxes 402, 412 are inside object boxes 404, 424 for vehicles and the images 400, 410 are therefore excluded from the training images. In this example, the threshold overlap value may be 100%, but other values are possible such as ones indicating that the bystander is too close to the vehicle, partially inside the vehicle, etc.

The shadow segmenter 206 may select candidate images to include as part of the training images where the bystander is associated with a body bounding box that is less than a threshold aspect ratio. The shadow segmenter 206 determines the aspect radio by dividing the width of the body bounding box by the height of the body bounding box. When the aspect ratio exceeds the threshold aspect ratio, the candidate image is likely to be occluded by objects in the candidate image.

The shadow segmenter 206 may select candidate images to include as part of the training images where the bystander is associated with a body bounding box that intersects with a mobile object bounding box that is less than the threshold overlap value. The mobile object may be a bicycle, a scooter, a tricycle, a unicycle, a skateboard, etc. FIG. 4 illustrates a third example image 450 and a fourth example image 460 where the body bounding boxes 452, 462 intersect with bicycle bounding boxes 454, 464 that are greater than the threshold overlap value and the images 450, 460 are therefore excluded from the training images.

Figure 5:
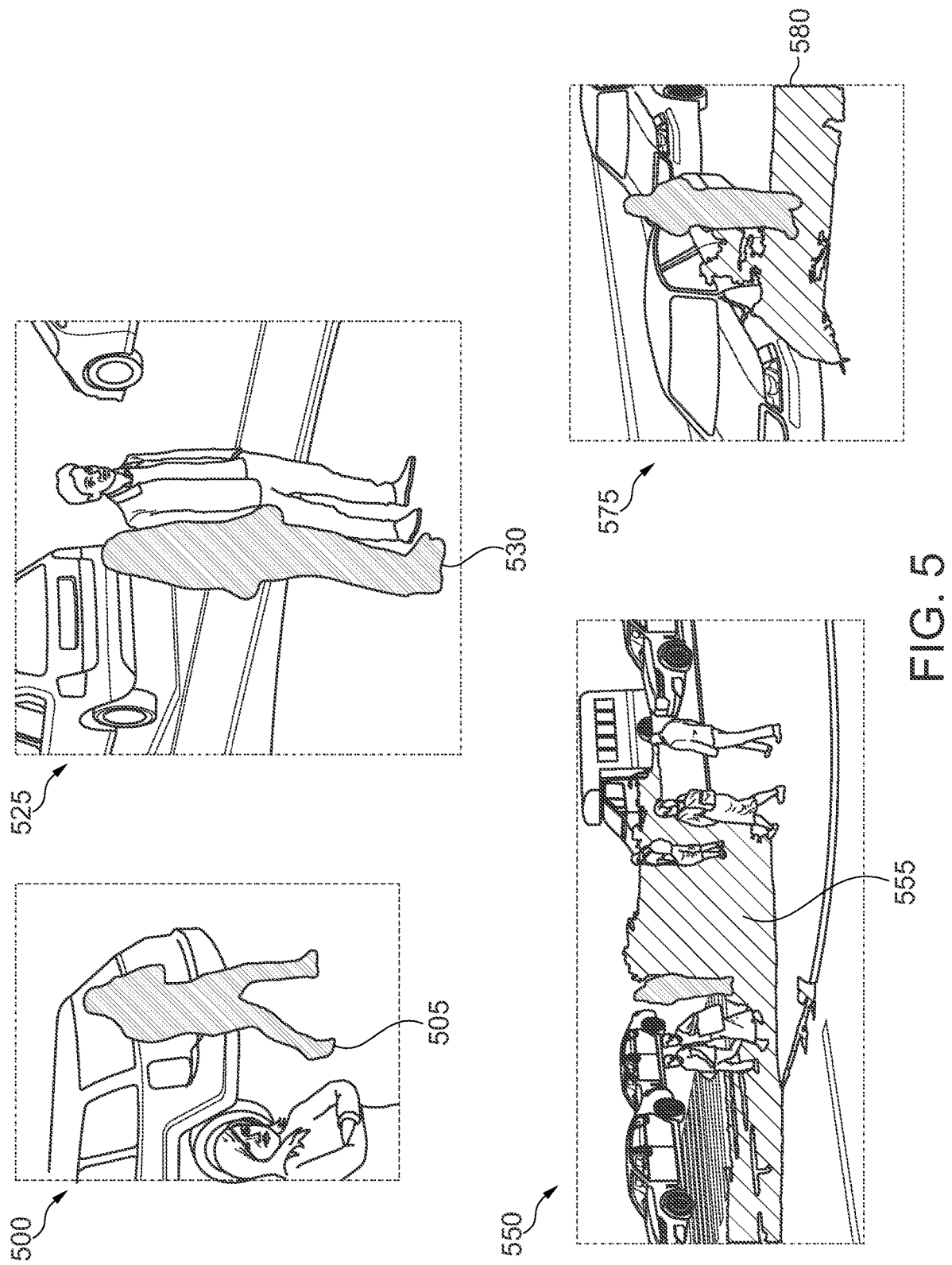
FIG. 5 illustrates example images that are excluded based on the size of the candidate shadow mask being too small or too large, according to some embodiments described herein.

The shadow segmenter 206 may select candidate images to include as training images where the groundtruth shadow mask is between a first threshold size and a second threshold size. The first threshold size may be for groundtruth shadow masks that are too small and the second threshold size may be for groundtruth shadow masks that are too large. For example, FIG. 5 illustrates a first image 500 and a second image 525 that both include groundtruth shadow masks 505, 530 that are excluded from the training images for failing to exceed the first threshold size because the shadow masks are too small. FIG. 5 further illustrates a third image 550 and a fourth image 575 that both include groundtruth shadow masks 555, 580. Images 550 and 575 are excluded from the training images for exceeding the second threshold size because the shadow masks 555 and 580 are larger than the second threshold.

Figure 6:
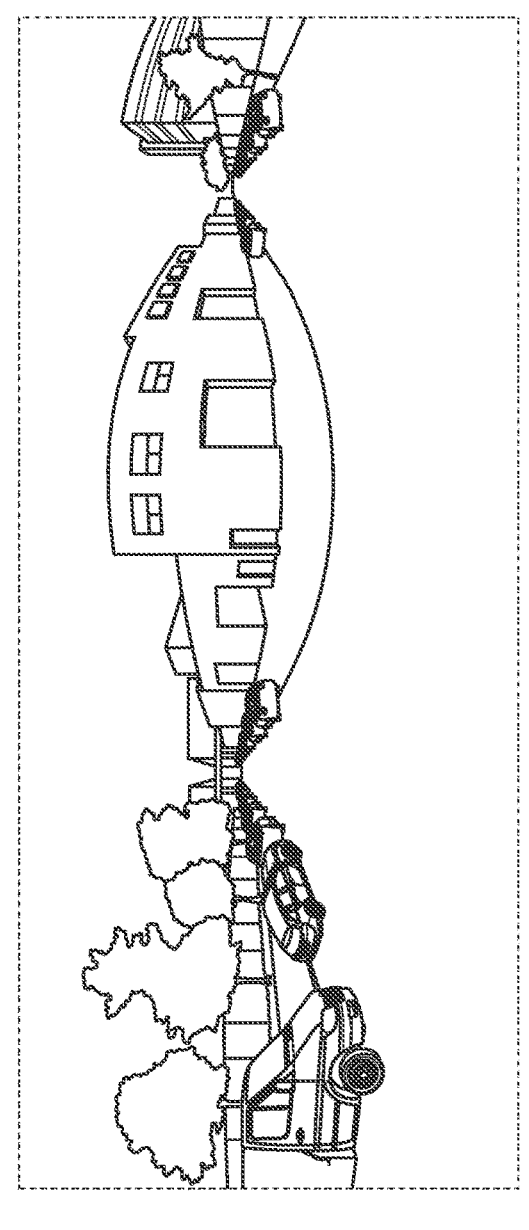
FIG. 6 illustrates an example excluded image where clouds prevent shadows from being cast and an example image with shadows, according to some embodiments described herein.
Figure 6:
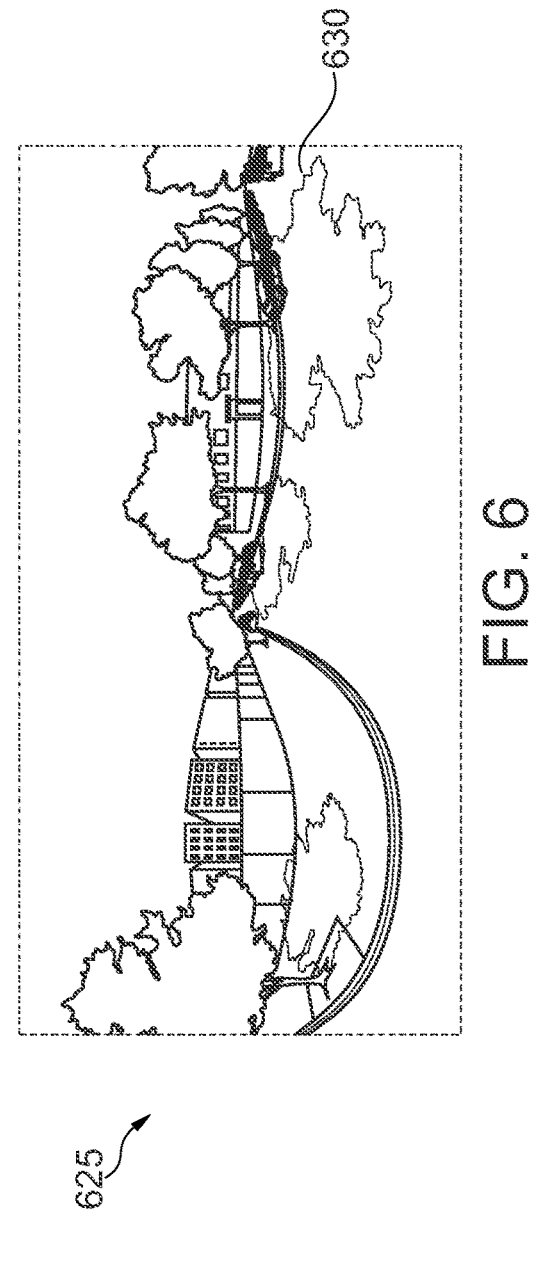

The shadow segmenter 206 may select candidate images to include as training images where the candidate images meet an illumination threshold. Use of the illumination threshold ensures that images taken in certain conditions, such as during a cloudy day, are not used because these conditions prevent shadows from being formed. FIG. 6 illustrates a first image 600 where the clouds have resulted in the objects in the scene not casting shadows and the first image 600 failing to meet the illumination threshold. As a result, the shadow segmenter 206 excludes the first image 600 from the training images. Conversely, the second image 625 in FIG. 6 includes enough illumination to meet the illumination threshold, where the shadows 630 associated with the trees are quite prominent.

The shadow segmenter 206 may select a candidate image to include as training images where the candidate image includes a shadow that emanates from a direction associated with the feet of the person in the image. In some embodiments, the shadow segmenter 206 determines the direction that the shadow should emanate from based on the geographic location on earth and the datetime corresponding to the metadata of the candidate image. For example, at a particular date, time, and location, the sun casts shadows at a particular angle and the shadow segmenter 206 may determine whether the shadow is associated with a person or something else in the image, such as a nearby object.

Figure 7:
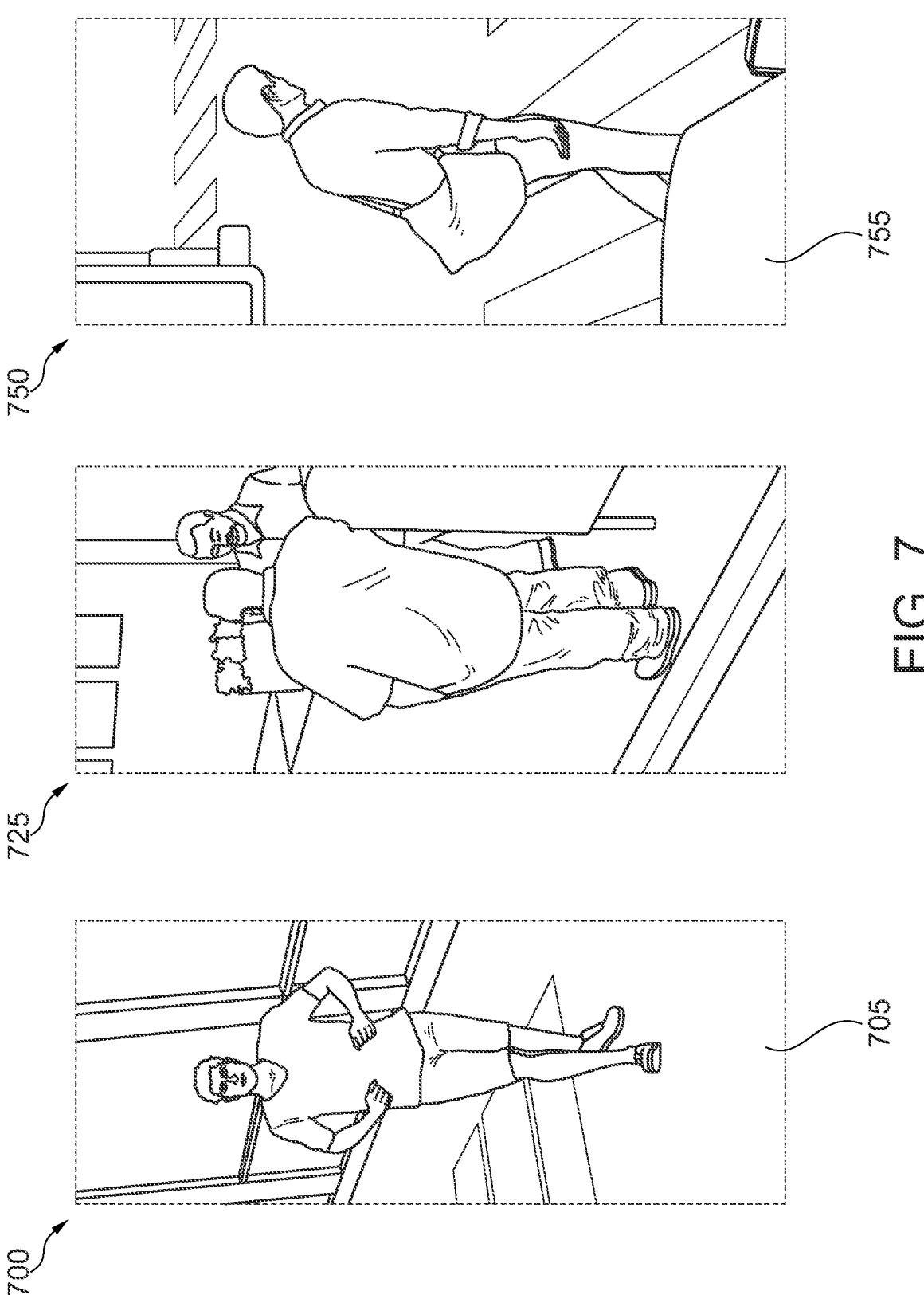
FIG. 7 illustrates example images in which a person depicted in the image does not cast a shadow, according to some embodiments.

The shadow segmenter 206 may select a candidate image to include as training images where the candidate image does not include a shadow. A person may not cast a shadow for several reasons including that the person is standing in a larger shadow, such as one cast by a building; the shadow is not visible, for example, because the person's feet are occluded; or the scene's illumination is overcast, resulting in no direct sunlight. FIG. 7 illustrates example images that do not include shadows where a first image 700 includes a person walking in a larger shadow 705 that covers a portion of the street, a second image 725 includes a scene that is so overcast that the person does not cast a shadow, and a third image 750 where a vehicle 755 occludes the feet of the person.

In some embodiments, the shadow segmenter 206 may select a candidate image that does not include a shadow to include as training images by running a shadow extraction algorithm to determine if the computed shadow fails to include a number of pixels that meet a threshold number of pixels (e.g., at least one pixel, at least five pixels, or another threshold). In some embodiments, the shadow segmenter 206 determines that a candidate image does not include a shadow by determining if the scene was captured during cloudy weather conditions, such as based on applying an illumination model. In some embodiments, the shadow segmenter 206 determines that a candidate image does not include a shadow by asking a human rater to identify applicable images by marking the images with a label that indicates that the images do not include a shadow.

Figure 8:
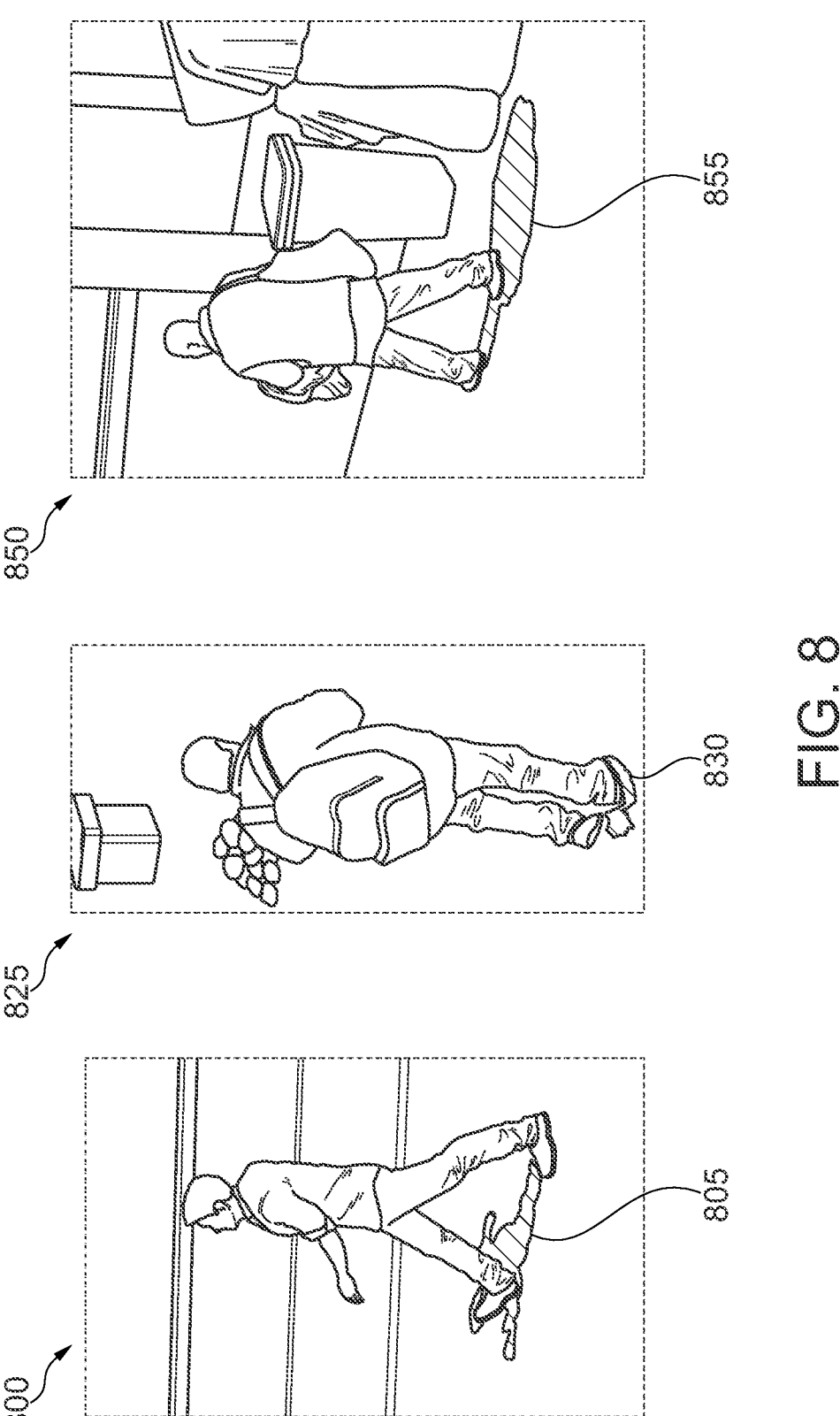
FIG. 8 illustrates example candidate images with groundtruth shadow masks as part of the training data, according to some embodiments described herein.

In some embodiments, the shadow segmenter 206 selects a candidate image to include as training images based on human feedback. For example, a human may rate images on a scale (e.g., 1-4, good vs bad, etc.). In some embodiments, a human rater receives the candidate images after the shadow segmenter 206 has selected candidate images to include as training images using the criteria described above. Turning to FIG. 8, example candidate images 800, 825, 850 are illustrated where the groundtruth shadow masks 805, 830, 855 are included as part of the training data.

The trained machine-learning model trained by the shadow segmenter 206 may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., an input layer) may receive data as input data or application data 266. Such data can include, for example, one or more pixels per node, e.g., when the trained model is used for analysis, e.g., of an image. Subsequent intermediate layers may receive as input, output of nodes of a previous layer per the connectivity specified in the model form or structure. These layers may also be referred to as hidden layers. A final layer (e.g., output layer) produces an output of the machine-learning model. In some implementations, model form or structure also specifies a number and/or type of nodes in each layer.

In different implementations, the trained shadow segmentation model can include one or more models. One or more of the models may include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a graphics processing unit (GPU), or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

Training may include applying supervised learning techniques. In supervised learning, the training data can include a plurality of inputs (e.g., a plurality of training images) and a corresponding groundtruth output for each input (e.g., groundtruth shadow mask for each training image of the plurality of training images). Based on a comparison of the output of the model (e.g., a predicted shadow mask) with the groundtruth output (e.g., the groundtruth shadow mask), values of the weights are automatically adjusted, e.g., in a manner that increases a probability that the model produces the groundtruth shadow output for the image.

In various implementations, a trained model includes a set of weights, or embeddings, corresponding to the model structure. In some implementations, the trained shadow segmentation model may include an initial set of weights, e.g., downloaded from a server that provides the weights. In various implementations, a trained shadow segmentation model includes a set of weights, or embeddings, corresponding to the model structure. In implementations where data is omitted, the shadow segmenter 206 may generate a trained shadow segmentation model that is based on prior training, e.g., by a developer of the shadow segmenter 206, by a third-party, etc.

In some embodiments, where the shadow segmentation model includes a convolutional neural network trained using supervised learning, the training of the shadow segmentation model may include, for each training image of the plurality of training images, obtaining a predicted shadow mask based on the training image. The shadow segmentation model may calculate a loss value based on a comparison of the predicted shadow mask and a groundtruth shadow mask (included in the training data) for the image. The shadow segmentation model may update a weight of one or more nodes of the convolutional neural network based on the loss value (e.g., in a way that, after adjustment and running another cycle of the training, the loss value is reduced, till the loss value is below a threshold).

Figure 9:
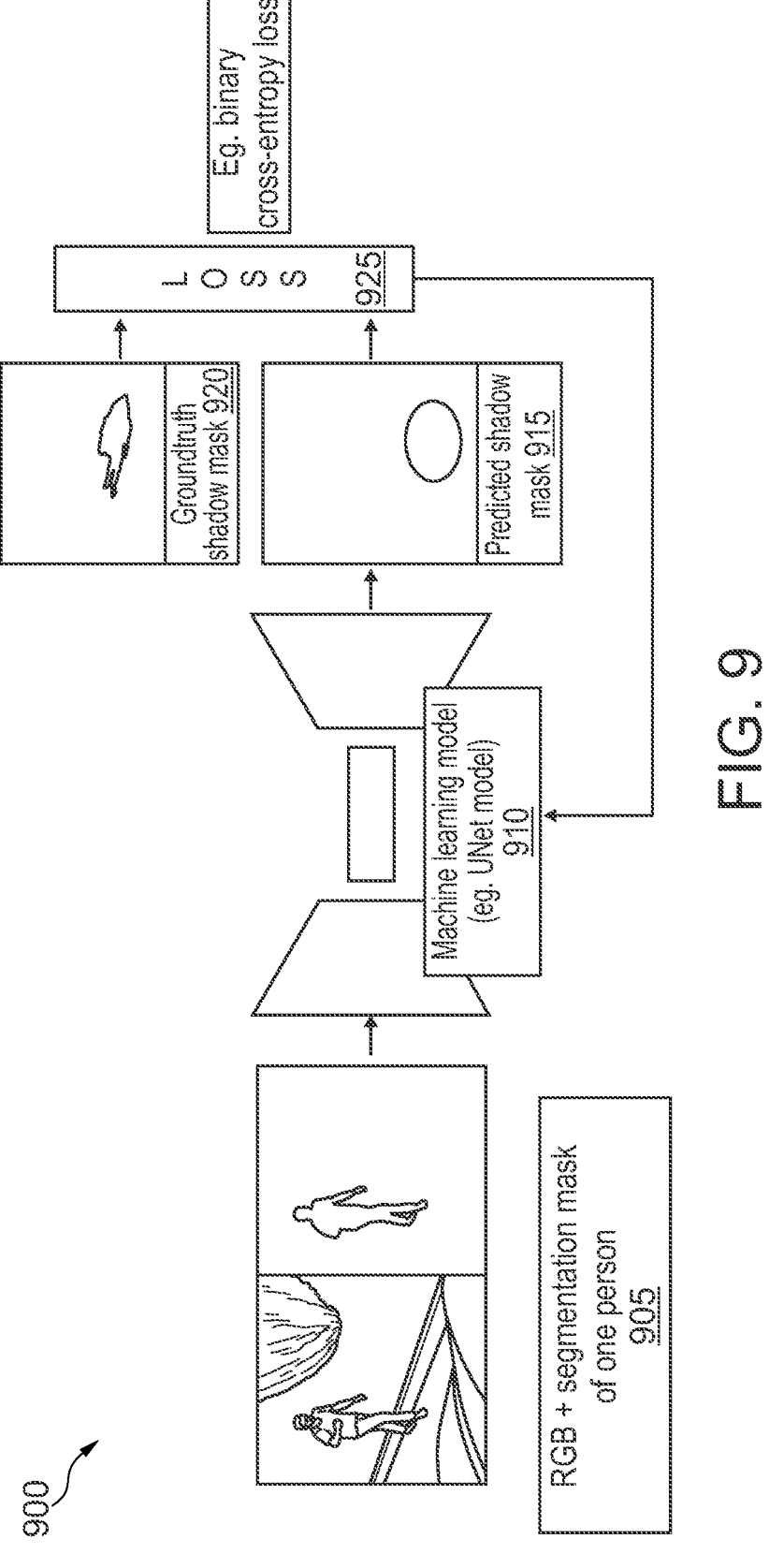
FIG. 9 illustrates an example flowchart of a method to train a machine-learning model to output shadow masks, according to some embodiments described herein.

FIG. 9 illustrates an example flowchart of a method 900 to train a machine-learning model to output shadow masks. An RGB image and a segmentation mask of one person 905 are provided as input to a machine-learning model 910, such as the shadow segmentation model described above. In some embodiments, the machine-learning model 910 is a convolutional neural network (CNN), such as UNet. The machine-learning model 910 outputs a predicted shadow mask 915. The predicted shadow mask 915 is compared to a groundtruth shadow mask 920 to determine a loss value 925. In some embodiments, the loss value 925 is calculated using a binary cross entropy loss, which is a comparison of each of the predicted probabilities to actual close output that is either 0 or 1. The loss value 925 is calculated as a score that reflects a distance between the predicted probabilities to the actual value. The score is utilized to update the weights of the model under training. The process may continue with additional training images until the score meets a threshold score (or training data/computing budget is exhausted) and the training is complete.

In some embodiments, where the shadow segmentation model includes a convolutional neural network trained using supervised learning, the training of the shadow segmentation model may include, for each training image of the plurality of training images, obtaining a predicted shadow mask based on the training image where one or more pixels of the training image that are associated with a person have values associated with a particular color that does not occur in natural images. The shadow segmentation model may calculate a loss value based on a comparison of the predicted shadow mask and the groundtruth shadow mask for the image. The shadow segmentation model may update a weight of one or more nodes of the convolutional neural network based on the loss value.

In some embodiments, the shadow segmenter 206 receives an image and a bystander mask. The shadow segmenter 206 provides the image and the bystander mask as input to the shadow segmentation model. In some embodiments, the shadow segmentation model outputs a shadow mask.

Figure 10A:
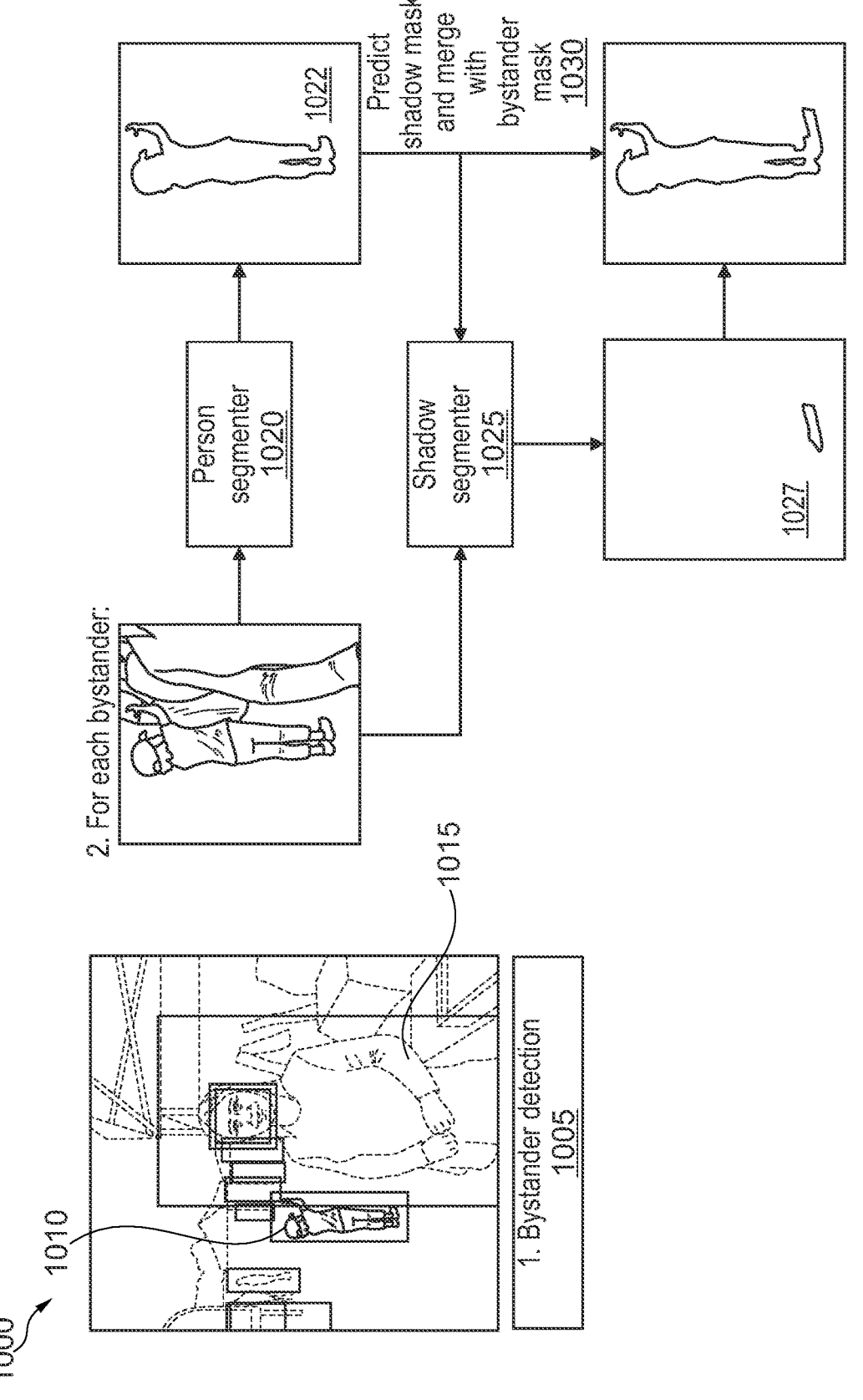
FIG. 10A illustrates an example flowchart of a method to output a merged bystander and shadow mask, according to some embodiments described herein.

FIG. 10A illustrates an example flowchart of a method 1000 to output a merged bystander and shadow mask. At step 1005, bystander detection is performed. For example, in this case a girl 1010 is detected to the right of the person 1015 that is the subject of the image. For each bystander, a person segmenter is applied 1020 and a shadow segmenter 1025 is applied. The person segmenter 1020 outputs a bystander mask 1022 and the shadow segmenter 1025 outputs a shadow mask 1027. At step 1030, the shadow mask and the bystander mask are merged.

Figure 10B:
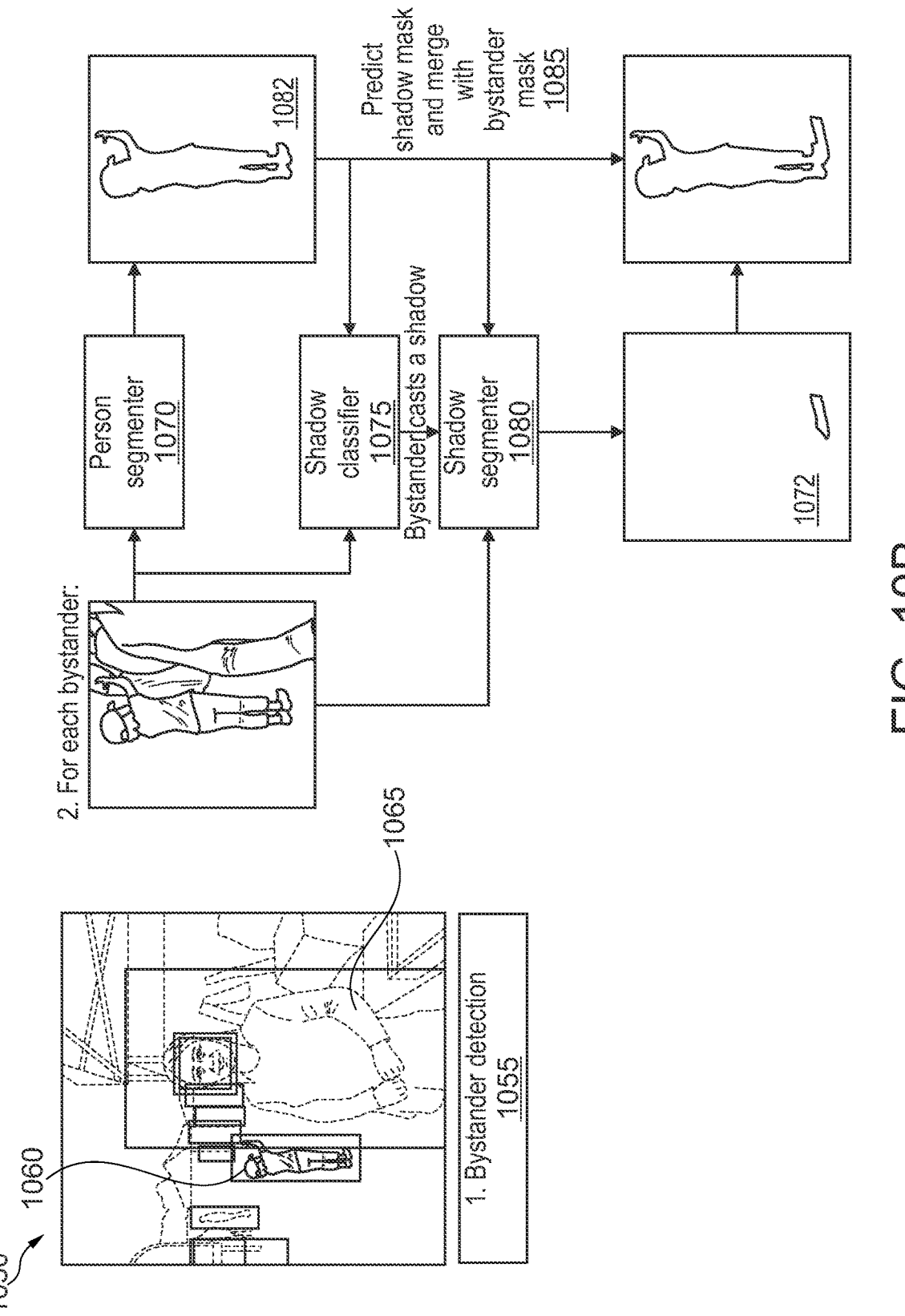
FIG. 10B illustrates an example flowchart of another method to output a merged bystander and shadow mask, according to some embodiments described herein.

FIG. 10B illustrates an example flowchart of another method 1050 to output a merged bystander and shadow mask. At step 1055, bystander detection is performed. For example, in this case a girl 1060 is detected to the fight of the person 1065 that is the subject of the image. For each bystander, a person segmenter is applied 1070, a shadow classifier 1075 determines whether the bystander casts a shadow, and if the bystander does cast a shadow, the shadow segmenter 1080 is applied. The person segmenter 1070 outputs a bystander mask 1072, the shadow classifier 1075 determines that the bystander casts a shadow, and the shadow segmenter 1080 outputs a shadow mask 1082. At step 1085, the shadow mask and the bystander mask are merged. If the shadow classifier 1075 determines that the bystander does not cast a shadow, the bystander mask is used as is for further tasks.

In some embodiments, the inpainter module 208 modifies the image to update pixel values of the plurality of first pixels and the plurality of second pixels such that the bystander and the shadow are erased from the image. The inpainter module 208 may apply an inpainting technique to update the pixel values of the plurality of first pixels and the plurality of second pixels. In some embodiments, the inpainter module 208 uses an inpainter model to apply the inpainting technique.

In some embodiments, the inpainter module 208 generates an inpainted image that updates the pixel values for pixels within the bystander mask and the shadow mask to match a background in the image such that the bystander and the shadow are erased from the image. The inpainter module 208 may update the pixel values of the plurality of first pixels that are part of the bystander mask separately from the pixel values of the plurality of second pixels that are part of the shadow mask. In some embodiments, the inpainter module 208 merges the bystander mask and the shadow mask to make a combined mask and the inpainter module 208 updates the pixel values of the pixels within the combined mask such that the bystander and the shadow are erased from the image.

The pixels that match a background may be based on another image of the same location without the subject and/or the bystander. Alternatively, the inpainter module 208 may match the pixels removed from the bystander mask based on pixels that surround the pixels included in the bystander mask. For example, where the bystander was standing on the ground, the inpainter module 208 replaces the pixels with pixels of the ground, such as in the third image 350 in FIG. 3. Other inpainting techniques are possible, including a machine-learning based inpainter technique.

In some embodiments, the techniques described above may be applied to a video. For example, the components of the media application 103 may derive the bystander mask and the shadow mask for a first image and then apply temporal smoothing between images to keep the mask pixels consistent or slowly change the mask over multiple frames so that there are no discontinuities across frames. In some embodiments, optical flow associated with the person is used to determine a direction of motion and the mask pixels are updated accordingly across frames of the video. In some embodiments, the bystander mask and the shadow mask are determined for a subset of the frames and interpolation is used to extend the mask across the entire video.

The user interface module 210 generates a user interface. In some embodiments, the user interface module 210 includes a set of instructions executable by the processor 235 to generate the user interface. In some embodiments, the user interface module 210 is stored in the memory 237 of the computing device 200 and can be accessible and executable by the processor 235.

The user interface module 210 generates a user interface that includes the inpainted image. In some embodiments, the user interface includes options for editing the inpainted image, sharing the inpainted image, adding the inpainted image to a photo album, etc.

Example Flowchart

FIG. 11 illustrates an example flowchart of a method 1100 to modify an image to erase a bystander and their shadow from an image based on a derived bystander mask and a derived shadow mask. The method 1100 may be performed by the computing device 200 in FIG. 2. In some embodiments, the method 1100 is performed by the user device 115, the media server 101, or in part on the user device 115 and in part on the media server 101 of FIG. 1.

The method 1100 of FIG. 11 may begin at block 1102. At block 1102, a bystander mask is derived from an image by analyzing the image with a bystander segmentation model. The image depicts a bystander and the bystander mask identifies a plurality of first pixels in the image that are associated with the bystander. Block 1102 may be followed by block 1104.

At block 1104, an optional step is to determine a likelihood of existence of the shadow using a shadow classifier model based on the image and the bystander mask. If the likelihood of existence of the shadow meets a threshold, block 1104 may be followed by block 1106.

At block 1106, a shadow mask for the bystander is derived by analyzing the image with a shadow segmentation model. The image is provided as input to the shadow segmentation model. The shadow mask identifies a plurality of second pixels in the image that are associated with a shadow of the bystander.

In some embodiments, the shadow segmentation model includes a convolutional neural network trained using supervised learning, where training the convolutional neural network is performed with a training dataset that includes a plurality of training images and a groundtruth shadow mask for each training image of the plurality of training images. The training may comprise, for each training image of the plurality of training images: obtaining a predicted shadow mask based on the training image and the groundtruth shadow mask associated with a person in the training image, calculating a loss value based on a comparison of the predicted shadow mask and the groundtruth shadow mask for the image, and updating a weight of one or more nodes of the convolutional neural network based on the loss value. In some embodiments, the training comprise, for each training image of the plurality of training images: obtaining a predicted shadow mask based on the training image, where one or more pixels of the training image that are associated with a person have values associated with a particular color that does not occur in natural images, calculating a loss value based on a comparison of the predicted shadow mask and the groundtruth shadow mask for the image, and updating a weight of one or more nodes of the convolutional neural network based on the loss value.

In some embodiments, the plurality of training images further including a segmentation mask that corresponds to the person in each training image of the plurality of training images and the training dataset is generated by including a candidate image in the plurality of training images that are selected from the group of the person being associated with a body bounding box that is less than a threshold overlap value with a vehicle bounding box, the body bounding box being associated with an aspect ratio that is less than a threshold aspect ratio, the segmentation mask being outside of a vehicle bounding box, the body bounding box intersecting with a mobile object bounding box less than the threshold overlap value, the groundtruth shadow mask being between a threshold first size and a threshold second size, the plurality of training images meeting an illumination threshold, the candidate image including a shadow that emanates from a direction associated with feet of the person, and combinations thereof. In some embodiments, one or more training images in the plurality of training images are associated with an empty groundtruth shadow mask. In some embodiments, an empty groundtruth shadow mask is one that identifies zero pixels as being part of a shadow cast by the person, ensuring that the training images include negative examples where there is no shadow (e.g., images taken at mid-day, images where the person is within a shadow of a larger object such as a building, etc.).

In some embodiments, one or more training images in the plurality of training images are generated from a series of candidate images of a scene that includes a person captured at different times by: generating a clean-plate image that contains static elements of the scene, comparing each candidate image in the series of candidate images to the clean-plate image to identify dynamic parts of the scene, generate the segmentation mask for the person in the series of images, and determining from the segmentation masks that pixels for the groundtruth shadow mask are adjacent to pixels corresponding to the segmentation mask.

In some embodiments, the image depicts two or more bystanders and the deriving, obtaining, and modifying are performed for each of the two or more bystanders. In some embodiments, the image is a single frame of a video. Block 1106 may be followed by block 1108.

At block 1108, an optional step is to merge the bystander mask and the shadow mask. Block 1108 may be followed by block 1110. At least one pixel in the first plurality of pixels of the bystander mask and at least one pixel in the second plurality of pixels of the shadow mask may be adjacent.

At block 1110, the image is modified to update pixels values of the plurality of first pixels and the plurality of second pixels (e.g., using an inpainting technique) such that the bystander and the shadow are erased from the image. Block 1110 may be followed by block 1112.

At block 1112, an optional step is to apply an inpainting technique to update the pixel values of the plurality of first pixels and the plurality of second pixels. The inpainting technique may be performed by an inpainter model.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMS, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:

deriving a bystander mask from an image by analyzing the image with a bystander segmentation model, wherein the image depicts a bystander and the bystander mask identifies a plurality of first pixels in the image that are associated with the bystander;

providing the image and the bystander mask as input to a shadow segmentation model, wherein the shadow segmentation model is trained with a training dataset of a plurality of training images, a segmentation mask associated with a person in each training image of the plurality of training images, and a groundtruth shadow mask for each training image of the plurality of training images, and wherein the plurality of training images are generated by including a candidate image in the plurality of training images that is selected from a group of the candidate image including the person that is associated with a body bounding box that is less than a threshold overlap value with a vehicle bounding box, the candidate image including the person that is associated with a body bounding box that has an aspect ratio that is less than a threshold aspect ratio, the candidate image including the segmentation mask that is outside of the vehicle bounding box, the candidate image including the person that is associated with a body bounding box intersecting with a mobile object bounding box less than a threshold overlap value, the candidate image including the groundtruth shadow mask that is between a threshold first size and a threshold second size, and combinations thereof;

outputting, with the shadow segmentation model, a shadow mask for the bystander, wherein the shadow mask identifies a plurality of second pixels in the image that are associated with a shadow of the bystander; and modifying the image to update pixel values of the plurality of first pixels and the plurality of second pixels such that the bystander and the shadow are erased from the image.

2. The computer-implemented method of claim 1, further comprising determining a likelihood of existence of the shadow using a shadow classifier model based on the image and the bystander mask, wherein providing the image and the bystander mask as input to the shadow segmentation model, outputting the shadow mask for the bystander, and modifying the image are performed if the likelihood of existence of the shadow meets a threshold.

3. The computer-implemented method of claim 1, wherein modifying the image comprises applying an inpainting technique to update the pixel values of the plurality of first pixels and the plurality of second pixels.

4. The computer-implemented method of claim 3, wherein the inpainting technique is performed by an inpainter model.

5. The computer-implemented method of claim 1, further comprising, prior to the modifying, merging the bystander mask and the shadow mask.

6. The computer-implemented method of claim 1, wherein the shadow segmentation model includes a convolutional neural network (CNN) and training the shadow segmentation model comprises, for each training image of the plurality of training images:

obtaining a predicted shadow mask based on the training image and the segmentation mask associated with the person in the training image;

calculating a loss value based on a comparison of the predicted shadow mask and the groundtruth shadow mask for the training image; and updating a weight of one or more nodes of the CNN based on the loss value.

7. The computer-implemented method of claim 1, wherein one or more training images in the plurality of training images are associated with an empty groundtruth shadow mask.

8. The computer-implemented method of claim 1, wherein one or more training images in the plurality of training images are generated from a series of candidate images of a scene that includes the person captured at different times by:

generating a clean-plate image that contains static elements of the scene;

comparing each candidate image in the series of candidate images to the clean-plate image to identify dynamic parts of the scene;

generating a plurality of segmentation masks for the person in the series of candidate images; and determining from the plurality of segmentation masks that pixels for the groundtruth shadow mask are adjacent to pixels corresponding to the segmentation mask of the plurality of segmentation masks.

9. The computer-implemented method of claim 1, wherein the shadow segmentation model includes a convolutional neural network (CNN) and training the shadow segmentation model comprises, for each training image of the plurality of training images:

obtaining a predicted shadow mask based on the training image, wherein one or more pixels of the training image that are associated with the person have values associated with a particular color that does not occur in natural images;

calculating a loss value based on a comparison of the predicted shadow mask and the groundtruth shadow mask for the training image; and updating a weight of one or more nodes of the CNN based on the loss value.

10. The computer-implemented method of claim 1, wherein the image depicts two or more bystanders, and wherein the providing, outputting, and modifying are performed for each of the two or more bystanders.

11. The computer-implemented method of claim 1, wherein the image is a single frame of a video.

12. The computer-implemented method of claim 1, wherein at least one pixel in the plurality of first pixels of the bystander mask and at least one pixel in the plurality of second pixels of the shadow mask are adjacent.

13. A non-transitory computer-readable medium with instructions stored thereon that, when executed by one or more computers, cause the one or more computers to perform operations, the operations comprising:

deriving a bystander mask from an image by analyzing the image with a bystander segmentation model, wherein the image depicts a bystander and the bystander mask identifies a plurality of first pixels in the image that are associated with the bystander;

providing the image and the bystander mask as input to a shadow segmentation model, wherein the shadow segmentation model is trained with a training dataset of a plurality of training images, a segmentation mask associated with a person in each training image of the plurality of training images, and a groundtruth shadow mask for each training image of the plurality of training images, wherein the plurality of training images are generated by including a candidate image in the plurality of training images that is selected from a group of the candidate image including the person that is associated with a body bounding box that is less than a threshold overlap value with a vehicle bounding box, the candidate image including the person that is associated with a body bounding box that has an aspect ratio that is less than a threshold aspect ratio, the candidate image including the segmentation mask that is outside of the vehicle bounding box, the candidate image including the person that is associated with a body bounding box intersecting with a mobile object bounding box less than a threshold overlap value, the candidate image including the groundtruth shadow mask that is between a threshold first size and a threshold second size, and combinations thereof;

outputting, with the shadow segmentation model, a shadow mask for the bystander, wherein the shadow mask identifies a plurality of second pixels in the image that are associated with a shadow of the bystander; and modifying the image to update pixel values of the plurality of first pixels and the plurality of second pixels such that the bystander and the shadow are erased from the image.

14. The non-transitory computer-readable medium of claim 13, wherein the operations further include determining a likelihood of existence of the shadow using a shadow classifier model based on the image and the bystander mask, wherein providing the image and the bystander mask as input to the shadow segmentation model, outputting the shadow mask for the bystander, and modifying the image are performed if the likelihood of existence of the shadow meets a threshold.

15. The non-transitory computer-readable medium of claim 13, wherein modifying the image comprises applying an inpainting technique to update the pixel values of the plurality of first pixels and the plurality of second pixels.

16. The non-transitory computer-readable medium of claim 13, wherein the operations further include, prior to the modifying, merging the bystander mask and the shadow mask.

17. A computing device comprising:

a processor; and a memory coupled to the processor, with instructions stored thereon that, when executed by the processor, cause the processor to perform operations comprising:

deriving a bystander mask from an image by analyzing the image with a bystander segmentation model, wherein the image depicts a bystander and the bystander mask identifies a plurality of first pixels in the image that are associated with the bystander;

providing the image and the bystander mask as input to a shadow segmentation model, wherein the shadow segmentation model is trained with a training dataset of a plurality of training images, a segmentation mask associated with a person in each training image of the plurality of training images, and a groundtruth shadow mask for each training image of the plurality of training images, and wherein the plurality of training images are generated by including a candidate image in the plurality of training images that is selected from a group of the candidate image including the person that is associated with a body bounding box that is less than a threshold overlap value with a vehicle bounding box, the candidate image including the person that is associated with a body bounding box that has an aspect ratio that is less than a threshold aspect ratio, the candidate image including the segmentation mask that is outside of the vehicle bounding box, the candidate image including the person that is associated with a body bounding box intersecting with a mobile object bounding box less than a threshold overlap value, the candidate image including the groundtruth shadow mask that is between a threshold first size and a threshold second size, and combinations thereof;

outputting, with the shadow segmentation model, a shadow mask for the bystander, wherein the shadow mask identifies a plurality of second pixels in the image that are associated with a shadow of the bystander; and modifying the image to update pixel values of the plurality of first pixels and the plurality of second pixels such that the bystander and the shadow are erased from the image.

18. The computing device of claim 17, wherein the operations further include determining a likelihood of existence of the shadow using a shadow classifier model based on the image and the bystander mask, wherein providing the image and the bystander mask as input to the shadow segmentation model, outputting the shadow mask for the bystander, and modifying the image are performed if the likelihood of existence of the shadow meets a threshold.

19. The computing device of claim 17, wherein modifying the image comprises applying an inpainting technique to update the pixel values of the plurality of first pixels and the plurality of second pixels.

20. The computing device of claim 17, wherein the operations further include, prior to the modifying, merging the bystander mask and the shadow mask.

* * * * *